(12) United States Patent
Tian et al.

(10) Patent No.: US 9,771,433 B1
(45) Date of Patent: Sep. 26, 2017

(54) RESIN COMPOSITION, RESIN MOLDED ARTICLE, AND METHOD OF PREPARING RESIN COMPOSITION

(71) Applicant: FUJI XEROX CO., LTD., Tokyo (JP)

(72) Inventors: Minquan Tian, Kanagawa (JP); Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/219,700

(22) Filed: Jul. 26, 2016

(30) Foreign Application Priority Data

Mar. 25, 2016 (JP) ................. 2016-062524

(51) Int. Cl.
| | | |
|---|---|---|
| C08B 3/06 | (2006.01) | |
| C08L 1/12 | (2006.01) | |
| C08L 67/00 | (2006.01) | |
| C08J 5/00 | (2006.01) | |
| C08K 5/11 | (2006.01) | |
| B29C 45/00 | (2006.01) | |
| B29K 1/00 | (2006.01) | |

(52) U.S. Cl.
CPC .......... *C08B 3/06* (2013.01); *C08J 5/00* (2013.01); *C08K 5/11* (2013.01); *C08L 1/12* (2013.01); *C08L 67/00* (2013.01); *B29C 45/0001* (2013.01); *B29K 2001/08* (2013.01); *C08J 2301/12* (2013.01); *C08J 2367/00* (2013.01); *C08J 2401/12* (2013.01); *C08J 2467/00* (2013.01)

(58) Field of Classification Search
CPC ........................................................ C08B 3/06
See application file for complete search history.

(56) References Cited

U.S. PATENT DOCUMENTS

| | | | |
|---|---|---|---|
| 8,003,715 B2 * | 8/2011 | Shelton | ............ C08B 3/16 524/35 |
| 9,074,021 B2 | 7/2015 | Uehira et al. | |
| 2008/0194807 A1 * | 8/2008 | Buchanan | ........... C07D 233/54 536/63 |

FOREIGN PATENT DOCUMENTS

JP           5470032 B2      4/2014

* cited by examiner

*Primary Examiner* — Melvin C Mayes
*Assistant Examiner* — Stefanie Cohen
(74) *Attorney, Agent, or Firm* — Oliff PLC

(57) ABSTRACT

A resin composition includes a cellulose derivative in which at least one hydroxyl group is substituted with an acyl group, which has a weight average molecular weight of 10,000 to 75,000 and an average degree of substitution of the acyl group of 1.8 to 2.5, and which exhibits an amount (weight ratio) of an insoluble portion, when being dissolved in tetrahydrofuran (THF) at 25° C., of less than or equal to 5% by weight.

14 Claims, No Drawings

RESIN COMPOSITION, RESIN MOLDED ARTICLE, AND METHOD OF PREPARING RESIN COMPOSITION

CROSS-REFERENCE TO RELATED APPLICATIONS

This application is based on and claims priority under 35 USC 119 from Japanese Patent Application No. 2016-062524 filed Mar. 25, 2016.

BACKGROUND

1. Technical Field

The present invention relates to a resin composition, a resin molded article, and a method of preparing a resin composition.

2. Related Art

In recent years, various resin compositions have been provided and have been used for various applications. Particularly, the resin compositions have been used in various components or housings or the like of home appliances or vehicles, or thermoplastic resins have also been used in components such as housings of business machines or electric and electronic apparatuses.

In recent years, plant-derived resins have been used, and there is a cellulose derivative as one of the plant-derived resins which have been known.

SUMMARY

According to an aspect of the invention, there is provided a resin composition including a cellulose derivative in which at least one hydroxyl group is substituted with an acyl group, which has a weight average molecular weight of 10,000 to 75,000 and an average degree of substitution of the acyl group of 1.8 to 2.5, and which exhibits an amount (weight ratio) of an insoluble portion, when being dissolved in tetrahydrofuran (THF) at 25° C., of less than or equal to 5% by weight.

DETAILED DESCRIPTION

Hereinafter, an exemplary embodiment of a resin composition and a resin molded article of the invention will be described.

Resin Composition

The resin composition according to the exemplary embodiment contains a cellulose derivative in which at least one hydroxyl group is substituted with an acyl group, which has a weight average molecular weight of 10,000 to 75,000 and an average degree of substitution of the acyl group of 1.8 to 2.5.

The amount (weight ratio) of an insoluble portion of this cellulose derivative when being dissolved in tetrahydrofuran (THF) at 25° C. is less than or equal to 5% by weight.

According to the resin composition relating to the exemplary embodiment, a resin molded article having excellent strength may be obtained.

The reason why such an effect is exhibited is inferred as follows.

In general, a resin molded article provided with excellent strength and heat resistance may be obtained from the viewpoint of characteristics of the chemical structure of a cellulose derivative or characteristics in which a hydrogen bonding force in or between molecules is strong. However, the thermal fluidity (that is, low melt viscosity when heat is applied) is low, and therefore, improvement in molding suitability when performing molding through heating and melting is desired.

In contrast, in the resin composition according to the exemplary embodiment, the weight average molecular weight of a cellulose derivative is within the range. In general, there is a tendency that the strength of a resin decreases as the molecular weight decreases. As the molecular weight of a cellulose derivative decreases, the number of terminals of the molecular chain relatively increases and the number of hydroxyl groups existing at these terminals also increases. For this reason, even if the weight average molecular weight of the cellulose derivative is as low as less than or equal to 75,000, a hydrogen bond is formed between hydroxyl groups at the terminals after molding in the cellulose derivative, and therefore, it is considered that the strength (for example, elastic modulus or tensile strength) is improved due to high hydrogen bonding force.

In contrast, the hydrogen bond between the terminals is weakened when being heated and melted. Therefore, the viscosity decreases due to the weight average molecular weight of the cellulose derivative being within the range, thereby improving thermal fluidity.

However, even in a case where the weight average molecular weight of the cellulose derivative is controlled within the range, in some cases, elastic modulus or tensile strength decreases, and therefore, further improvement in the strength is desired.

In contrast, in the exemplary embodiment, the strength of a resin molded article is improved by adjusting the amount (weight ratio) of an insoluble portion with respect to tetrahydrofuran (THF) at 25° C. to the amount falling within the range.

Here, in the cellulose derivative which is substituted with an acyl group and of which the average degree of substitution thereof is within the range, it is considered that the amount of the insoluble portion with respect to tetrahydrofuran (THF) at 25° C. being within the range is an indicator that the proportion of the cellulose derivative having a degree of substitution exceeding 2.5 is reduced.

It is considered that, in the cellulose derivative of which the degree of substitution exceeds 2.5, an interaction between substituents becomes strong, and the mobility of molecules decreases, and therefore, the cellulose derivative hardly forms an intramolecular hydrogen bond. As a result, elastic modulus decreases and strength also decreases. In the exemplary embodiment, it is considered that the proportion of the cellulose derivative of which the degree of substitution exceeds 2.5 is reduced. Therefore, inhibition of the intramolecular hydrogen bond in the cellulose derivative is prevented and the elastic modulus increases. As a result, excellent strength may be obtained.

THF Insoluble Portion

The amount (weight ratio) of an insoluble portion of the cellulose derivative in the exemplary embodiment with respect to tetrahydrofuran (THF) at 25° C. is less than or equal to 5% by weight. If the THF insoluble portion exceeds 5% by weight, the strength deteriorates when a resin molded article is obtained.

It is preferable that the amount of the THF insoluble portion is further less than or equal to 3% by weight, and it is more preferable that the amount of the THF insoluble portion is less than or equal to 2% by weight.

A method of measuring the insoluble portion of the cellulose derivative with respect to tetrahydrofuran (THF) will be described below.

DMSO Insoluble Portion

The amount (weight ratio) of the insoluble portion of the cellulose derivative in the exemplary embodiment with respect to dimethyl sulfoxide (DMSO) at 25° C. is preferably less than or equal to 1% by weight.

Excellent strength may be obtained when a resin molded article is obtained by making the DMSO insoluble portion be less than or equal to 1% by weight.

Here, in the cellulose derivative which is substituted with an acyl group and of which the average degree of substitution thereof is within the range, it is considered that the amount of the insoluble portion with respect to dimethyl sulfoxide (DMSO) at 25° C. being within the range is an indicator that the proportion of the cellulose derivative of which the degree of substitution is less than 1.8 is reduced.

It is considered that, in the cellulose derivative of which the degree of substitution is less than 1.8, an interaction between substituents becomes weak, and therefore, causes plasticization. As a result, elastic modulus decreases and the strength also decreases. If the DMSO insoluble portion is within the above-described range, it is considered that the proportion of the cellulose derivative of which the degree of substitution is less than 1.8 is reduced. Therefore, plasticization in the cellulose derivative is prevented and the elastic modulus increases. As a result, excellent strength may be obtained.

It is preferable that the amount of the DMSO insoluble portion is further less than or equal to 0.8% by weight, and it is more preferable that the amount of the DMSO insoluble portion is less than or equal to 0.5% by weight.

A method of measuring the insoluble portion of the cellulose derivative with respect to dimethyl sulfoxide (DMSO) will be described below.

Control Method

Here, in a cellulose derivative of which the average degree of substitution of an acyl group is 1.8 to 2.5, examples of the method of controlling the amount of the insoluble portion with respect to tetrahydrofuran (THE) and the amount of the insoluble portion with respect to dimethyl sulfoxide (DMSO) at 25° C. within the range include a method of reducing the amount of a cellulose derivative of which the degree of substitution using an acyl group is high and a cellulose derivative of which the degree of substitution using an acyl group is low. That is, examples thereof include a method of narrowing the distribution of the degree of substitution using an acyl group (setting the cellulose derivative to have sharp substitution distribution).

Specific methods are not particularly limited. However, examples of the method include a method of adjusting the amount of sulfuric acid when preparing a cellulose derivative through esterification by substituting cellulose with an acyl group. In the case where the amount of sulfuric acid is made larger, substitution with an acyl group is performed almost uniformly, so that a cellulose derivative having a narrower distribution of the degree of substitution is obtained.

Specifically, when esterifying cellulose by substituting the cellulose with an acyl group, the existing amount of sulfuric acid with respect to 100 parts by weight of a solid content of the cellulose is preferably 6 parts by weight to 20 parts by weight, more preferably 7 parts by weight to 18 parts by weight, and still more preferably 8 parts by weight to 15 parts by weight.

Hereinafter, components of the resin composition according to the exemplary embodiment will be described.

Cellulose Derivative

Weight Average Molecular Weight

The weight average molecular weight of the cellulose derivative used in the exemplary embodiment is 10,000 to 75,000. This weight average molecular weight is still more preferably 20,000 to 50,000.

If the weight average molecular weight exceeds 75,000, the elastic modulus decreases and heat resistance or thermal fluidity also deteriorates. In contrast, if the weight average molecular weight is less than 10,000, the molecular weight is too low, and therefore, the elastic modulus decreases and the heat resistance also decreases.

Here, the weight average molecular weight (Mw) is a value measured through gel permeation chromatography (GPC). Specifically, the measurement of the molecular weight performed through GPC is carried out using a GPC device (manufactured by Tosoh Corporation, HLC-8320GPC, column: TSKgel α-M) using a solution of dimethylacetamide/lithium chloride having a weight ratio of 90/10.

Structure

The cellulose derivative is a cellulose derivative which is obtained by esterifying cellulose with at least an acyl group, and specific examples thereof include a cellulose derivative represented by the formula (1).

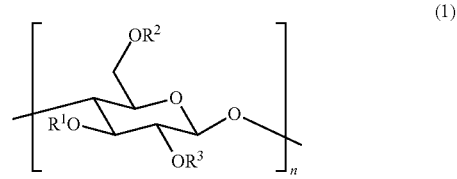

$R^1$, $R^2$, and $R^3$ in the formula (1) each independently represent a hydrogen atom or an acyl group. n represents an integer of 2 or greater. However, at least one of n numbers of $R^1$s, n numbers of $R^2$s, or n numbers of $R^3$s represents an acyl group.

The acyl group represented by $R^1$, $R^2$, and $R^3$ is still more preferably an acyl group having 1 to 6 carbon atoms.

In the formula (1), the range of n is not particularly limited, but is preferably 40 to 300 and is more preferably 100 to 200.

If n is greater than or equal to 40, the strength of a resin molded article easily increases. If n is less than or equal to 300, deterioration in flexibility of the resin molded article is easily prevented.

Acyl Group

In the cellulose derivative used in the exemplary embodiment, at least one hydroxyl group is substituted with an acyl group (more preferably, an acyl group having 1 to 6 carbon atoms). That is, in a case of the cellulose derivative having the structure represented by the formula (1), at least one of n numbers of $R^1$s, n numbers of $R^2$s, or n numbers of $R^3$s represents an acyl group.

Accordingly, all of or a part of n numbers of $R^1$s in the cellulose derivative represented by the formula (1) may be the same as or different from each other. Similarly, all of or apart of n numbers of $R^2$s and $R^3$s may be the same as or different from each other. At least one thereof represents an acyl group.

With respect to the cellulose derivative having an acyl group having 1 to 6 carbon atoms, the elastic modulus increases and the heat resistance is also improved, compared to a case where all acyl groups substituting for the cellulose derivative have greater than or equal to 7 carbon atoms.

The number of carbon atoms of the acyl group substituting for the cellulose derivative is preferably 2 to 4 and more preferably 2 to 3.

The acyl group is represented by a structure of "—CO—$R_{AC}$", and $R_{AC}$ represents a hydrogen atom or a hydrocarbon group (more preferably a hydrocarbon group having 1 to 5 carbon atoms).

The hydrocarbon group represented by $R_{AC}$ may be any of a linear, branched, or cyclic group, and is more preferably a linear group.

In addition, the hydrocarbon group may be a saturated hydrocarbon group or an unsaturated hydrocarbon group, and is more preferably a saturated hydrocarbon group.

In addition, the hydrocarbon group may have atoms (for example, oxygen or nitrogen) other than a carbon atom and a hydrogen atom, and is more preferably a hydrocarbon group consisting of a carbon atom and a hydrogen atom.

Examples of the acyl group include a formyl group, an acetyl group, a propionyl group, a butyryl group (butanoyl group), a propenoyl group, and a hexanoyl group.

Among these, an acetyl group is preferable from the viewpoints of improving elastic modulus and heat resistance and improving moldability of a resin composition.

Average Degree of Substitution

The average degree of substitution of a cellulose derivative is from 1.8 to 2.5. Furthermore, a range of 2 to 2.5 is more preferable and a range of 2.2 to 2.5 is still more preferable.

By setting the average degree of substitution to less than or equal to 2.5, an interaction between substituents does not become too strong and deterioration of the mobility of molecules is prevented. Therefore, a hydrogen bond is easily formed between molecules, and thus, the elastic modulus is more increased and the heat resistance is also more increased. In contrast, by setting the average degree of substitution to greater than or equal to 1.8, an interaction between molecules does not become too weak and plasticization is prevented. As a result, the elastic modulus is more increased and the heat resistance is more increased.

The average degree of substitution is an indicator showing the degree of acylation of a cellulose derivative. Specifically, the average degree of substitution means the intramolecular average of the number of times of substitution in which three hydroxyl groups by a D-glucopyranose unit of the cellulose derivative are substituted with acyl groups.

Synthesis Method

The cellulose derivative used in the exemplary embodiment is not particularly limited, but is synthesized through, for example, the following method.

Adjustment of Molecular Weight of Cellulose

First, cellulose before acylation, that is, cellulose in which hydroxyl groups are not substituted with acyl groups is prepared, and the molecular weight thereof is adjusted.

Prepared cellulose or commercially available cellulose may be used as the cellulose before the acylation. In general, cellulose is a plant-derived resin, and the weight average molecular weight thereof is generally higher than that of the cellulose derivative in the exemplary embodiment. For this reason, the adjustment of the molecular weight of cellulose generally becomes a step of reducing the molecular weight.

For example, the weight average molecular weight of commercially available cellulose is generally within a range of 150,000 to 500,000.

Examples of the commercially available products of the cellulose before acylation include KC flock W50, W100, W200, W300G, W400G, W-100F, W60MG, W-50GK, W-100GK, NDPT, NDPS, LNDP, and NSPP-HR manufactured by Nippon Paper Industries Co., Ltd.

The method of adjusting the molecular weight of the cellulose before the acylation is not particularly limited, but examples thereof include a method of reducing the molecular weight by stirring the cellulose in a liquid.

It is possible to adjust the molecular weight of cellulose to a desired value by adjusting the speed, time, or the like during the stirring. The stirring speed during the stirring is not particularly limited, but is preferably within a range of 50 rpm to 3,000 rpm and more preferably within a range of 100 rpm to 1,000 rpm. In addition, the stirring time is preferably within a range of 1 hour to 48 hours and more preferably within a range of 2 hours to 24 hours.

Examples of the liquid used during the stirring include an aqueous hydrochloric acid solution, an aqueous formic acid solution, an aqueous acetic acid solution, an aqueous nitric acid solution, and an aqueous sulfuric acid solution.

Preparation of Cellulose Derivative

A cellulose derivative may be obtained by acylating cellulose, of which the molecular weight is adjusted through the above-described method or the like, using an acyl group through a well-known method.

In a case where a part of hydroxyl groups which the cellulose has is substituted with an acetyl group, examples of the method include a method or the like of esterifying cellulose using a mixture of acetic acid, acetic anhydride, and sulfuric acid. In addition, examples of the method include an esterification method using propionic anhydride instead of acetic anhydride of the mixture in a case where the part of hydroxyl groups is substituted with a propionyl group; an esterification method using butyl anhydride instead of acetic anhydride of the mixture in a case where the part of hydroxyl groups is substituted with a butanoyl group; an esterification method using hexanoic anhydride instead of acetic anhydride of the mixture in a case where the part of hydroxyl groups is substituted with a hexanoyl group.

In the step of acylating cellulose with an acyl group, it is preferable to adjust the amount of sulfuric acid from the viewpoint of controlling the amount of an insoluble portion with respect to tetrahydrofuran (THF) and the amount of an insoluble portion with respect to dimethyl sulfoxide (DMSO) at 25° C. within the range. In the case where the amount of sulfuric acid is made larger, substitution with an acyl group is performed almost uniformly, so that a cellulose derivative having a narrower distribution of the degree of substitution is obtained and the THF insoluble portion and the DMSO insoluble portion are controlled within the ranges, respectively.

Specifically, it is preferable that the amount of sulfuric acid with respect to the solid content of cellulose when esterifying the cellulose by substituting the cellulose with an acyl group is within the above-described range.

After the acylation, a deacylation step may be further provided for the purpose of adjusting the average degree of substitution. In addition, a purification step may be further provided after the acylation step or the deacylation step.

Ratio of Cellulose Derivative Occupied in Resin Composition

The ratio of a cellulose derivative occupied in the total amount of the resin composition according to the exemplary embodiment is preferably greater than or equal to 70% by weight and more preferably greater than or equal to 80% by weight. By making the ratio be greater than or equal to 70% by weight, the elastic modulus is more increased and the heat resistance is also more increased.

Plasticizer

The resin Composition according to the exemplary embodiment may further contain a plasticizer.

The content of the plasticizer is preferably an amount in which the ratio of the cellulose derivative occupied in the total amount of the resin composition becomes within the above-described range. More specifically, the ratio of the plasticizer occupied in the total amount of the resin composition is preferably less than or equal to 15% by weight, more preferably less than or equal to 10% by weight, and still more preferably less than or equal to 5% by weight. By setting the ratio of the plasticizer to be within the above-described range, the elastic modulus is more increased and the heat resistance is also more increased. In addition, bleeding of the plasticizer is also prevented.

Examples of the plasticizer include an adipic acid ester-containing compound, a polyether ester compound, a sebacic acid ester compound, a glycol ester compound, acetic acid ester, a dibasic acid ester compound, a phosphate ester compound, a phthalic acid ester compound, camphor, citric acid ester, stearic acid ester, metallic soap, polyols, and polyalkylene oxide.

Among these, an adipic acid ester-containing compound and a polyether ester compound are preferable and an adipic acid ester-containing compound is more preferable.

Adipic Acid Ester-Containing Compound

An adipic acid ester-containing compound (compound containing adipic acid ester) indicates a single compound of adipic acid ester, or a mixture of adipic acid ester and components (compounds different from adipic acid ester) other than adipic acid ester. However, the adipic acid ester-containing compound may contain greater than or equal to 50% by weight of adipic acid ester with respect to the total components.

As the adipic acid ester, for example, adipic acid diester, and adipic acid polyester are exemplified. Specifically, adipic acid diester represented by the formula (2-1) and adipic acid polyester represented by the formula (2-2) are exemplified.

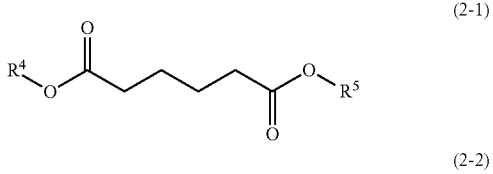

(2-1)

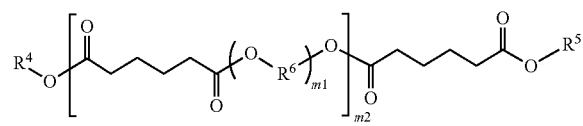

(2-2)

In the formulae (2-1) and (2-2), $R^4$ and $R^5$ each independently represents an alkyl group, or a polyoxyalkyl group [—($C_xH_{2x}$—O)y-$R^{41}$] (provided that $R^{41}$ represents an alkyl group, x represents an integer in the range of 1 to 10, and y represents an integer in the range of 1 to 10).

$R^6$ represents an alkylene group.

m1 represents an integer in the range of 1 to 20.

m2 represents an integer in the range of 1 to 10.

In the formulae (2-1) and (2-2), the alkyl groups represented by $R^4$ and $R^5$ are preferably alkyl groups having 1 to 6 carbon atoms, and more preferably alkyl groups having 1 to 4 carbon atoms. The alkyl groups represented by $R^4$ and $R^5$ may have anyone of a linear shape, a branched shape, or a cyclic shape, but preferably a linear shape and a branched shape.

In the formulae (2-1) and (2-2), in the polyoxyalkyl group represented by $R^4$ and $R^5$ [—($C_xH_{2x}$—O)y-$R^{41}$] the alkyl group represented by $R^{41}$ is preferably an alkyl group having 1 to 6 carbon atoms, and more preferably an alkyl group having 1 to 4 carbon atoms. The alkyl group represented by $R^{41}$ may have any one of a linear shape, a branched shape, or a cyclic shape, but preferably a linear shape and a branched shape.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of symbols $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the examples are not limited thereto.

| | Name of Material | Name of Product | Manufacturer |
|---|---|---|---|
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, for example, a polyether ester compound represented by the formula (3) is exemplified.

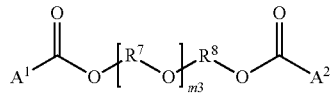

(3)

In the formula (3), $R^7$ and $R^8$ each independently represent an alkylene group having 2 to 10 carbon atoms. $A^1$ and $A^2$ each independently represent an alkyl group having 1 to 6 carbon atoms, an aryl group having 6 to 12 carbon atoms, or an aralkyl group having 7 to 18 carbon atoms. m represents an integer of 1 or greater.

In the formula (3), as the alkylene group represented by $R^7$, an alkylene group having 3 to 10 carbon atoms is preferable, and an alkylene group having 3 to 6 carbon atoms is more preferable. The alkylene group represented by $R^7$ may have any one of a linear shape, a branched shape, or a cyclic shape, but preferably a linear shape.

If the number of carbons of the alkylene group represented by $R^7$ is set to be 3 or greater, the decrease of the fluidity of the resin composition is prevented, and thermoplasticity is easily exhibited. If the number of carbons of the alkylene group represented by $R^7$ is 10 or lower, or the alkylene group represented by $R^7$ has a linear shape, the affinity to the cellulose derivative is easily enhanced. Therefore, if the alkylene group represented by $R^7$ has a linear shape, and the number of carbons is in the range described above, moldability of the resin composition is enhanced.

In this point of view, particularly, the alkylene group represented by $R^7$ is preferably a n-hexylene group (—$(CH_2)_6$—). That is, the polyether ester compound is preferably a compound where $R^7$ represents a n-hexylene group (—$(CH_2)_6$—).

In the formula (3), as the alkylene group represented by $R^8$, an alkylene group having 3 to 10 carbon atoms is preferable, and an alkylene group having 3 to 6 carbon atoms is more preferable. The alkylene group represented by $R^8$ may have any one of a linear shape, a branched shape, or a cyclic shape, but preferably a linear shape.

If the number of carbons of the alkylene group represented by $R^8$ is 3 or greater, the decrease of the fluidity of the resin composition is prevented, and the thermoplasticity is easily exhibited. If the number of carbons of the alkylene group represented by $R^8$ is 10 or lower, or if the alkylene group represented by $R^8$ has a linear shape, the affinity to the cellulose derivative is easily enhanced. Therefore, if the alkylene group represented by $R^8$ has a linear shape, and the number of carbons is in the range described above, moldability of the resin composition is enhanced.

In this point of view, particularly, the alkylene group represented by $R^8$ is preferably a n-butylene group (—$(CH_2)_4$—). That is, the polyether ester compound is preferably a compound where $R^8$ represents a n-butylene group (—$(CH_2)_4$—).

In the formula (3), the alkyl groups represented by $A^1$ and $A^2$ are alkyl groups having 1 to 6 carbon atoms, and alkyl groups having 2 to 4 carbon atoms are more preferable. The alkyl groups represented by $A^1$ and $A^2$ may have anyone of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by —$R^4$-Ph. $R^4$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzyl group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh Corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

$$\text{SP value} = \sqrt{(Ev/v)} = \sqrt{(\Sigma \Delta ei / \Sigma \Delta vi)} \qquad \text{Equation:}$$

In the equation, Ev: evaporation energy (cal/mol), v: molar volume (cm$^3$/mol), Δei: evaporation energy of each atom or atom group, and Δvi: molar volume of each atom or atom group.

In addition, the solubility parameter (SP value) employs (cal/cm$^3$)$^{1/2}$ as a unit, but the unit is omitted in conformity with practice, and is described in a dimensionless manner.

Hereinafter, specific examples of the polyether ester compound are described, but the invention is not limited thereto.

| | $R^7$ | $R^8$ | $A^1$ | $A^2$ | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight to 5% by weight with respect to the total amount of the resin composition. Here, the expression "0% by weight" means not including other components.

The resin composition according to the exemplary embodiment may contain other resins in addition to the resin described above. However, the other resins are included in amounts with which the ratio of the cellulose derivative occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyether ether ketone resin; a polyarylketone resin; a polyether nitrile resin; a liquid crystal resin; a polybenzimidazole resin; polyparabanic acid resin; a vinyl polymer or a vinyl copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

Method of Preparing Resin Composition

The resin composition according to the exemplary embodiment, for example, may be prepared by molten-kneading the above-described cellulose derivative or a mixture at least containing the above-described cellulose derivative and the other components such as the plasticizer. In addition, the resin composition according to the exemplary embodiment, for example, is prepared by dissolving the above-described components in a solvent.

For molten-kneading, known machines may be used, and specific examples thereof include a twin-screw extruder, a HENSCHEL MIXER, a BANBURY MIXER, a single-screw extruder, multi-screw extruder, and a co-kneader.

In addition, the temperature at the time of kneading may be determined according to the melting temperature of the cellulose derivative used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 200° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

EXAMPLES

Hereinafter, the invention is described in greater detail with reference to examples, but the invention is not limited to the examples. In addition, unless described otherwise, the expression "part" refers to "part by weight".

Example 1

Depolymerization 50 g of powdered cellulose (manufactured by Nippon Paper Industries Co., Ltd., KC FLOCK W-50GK) and 750 g of 1 mol/L hydrochloric acid (Wako Pure Chemical Industries, Ltd.) are added to a 1 L eggplant-shaped flask. The mixture is heated up until reflux while being stirred (rotational speed of 75 rpm to 100 rpm) by a stirrer, and is subjected to a reflux reaction for 2 hours. After cooling the reaction mixture, precipitates are suction-filtered and washed with 600 ml of distilled water. The obtained precipitates are vacuum-dried at 40° C. to obtain 47 g of cellulose (white solid) (94% of yield).

The weight average molecular weight Mw of the obtained cellulose is 25,000.

The molecular weight is measured by a GPC device (manufactured by Tosoh Corporation, HLC-8320GPC, column: TSKgelα-M) using a solution of dimethylacetamide/lithium chloride having a weight ratio of 90/10.

Acetylation 500 g of glacial acetic acid is added to 100 g of the cellulose. Next, a liquid mixture of 500 g of glacial acetic acid (99.5% by weight) and 8.1 g of sulfuric acid (96% by weight) is added thereto, and the mixture is stirred using a stirrer for 1 hour at room temperature. In this step, the ratio of the sulfuric acid to the cellulose corresponds to 7.8% by weight.

The reaction mixture is cooled with cold water (13° C.) and 500 g of acetic anhydride (special grade, 97% by weight) is added dropwise while stirring the mixture. The internal temperature is controlled to be less than or equal to 35° C. The cool bath is removed and the mixture is stirred for 4 hours at room temperature (RT, 24° C.) to obtain a translucent white liquid.

After the stirring, the reaction liquid is cooled with cold water (8° C.). Then, a liquid mixture of 175.5 g of acetic acid and 75 g of water is added dropwise for 30 minutes while being stirred (the internal temperature is controlled to become less than or equal to 35° C.) and is stirred for 30 minutes at room temperature (24° C.). The reaction liquid is reprecipitated in purified water (10 L, stirred) of 5 times the amount of the reaction liquid, and is filtered under reduced pressure after being stirred for 20 minutes to obtain white precipitates.

These white precipitates are dispersed in 10 L of purified water, and are filtered under reduced pressure after being stirred for 15 minutes. This washing step is repeated four times. In the filtrate of the final washing step, the pH is 6 and the electric conductivity is 26 μS/cm.

Drying is performed through freeze-drying to obtain 162 g of white powder (triacetate cellulose) (yield of 91%).

Deacetylation 960 g of acetic acid is added to 115.2 g of the obtained white powder (triacetate cellulose), and the mixture is stirred up until the white powder is completely dissolved. This solution is heated to 40° C., and 236.1 g of a 2.54% by weight aqueous hydrochloric acid solution is added to the solution for 30 minutes. Then, the mixture is stirred for 15 hours at 40° C. A supernatant component of the reaction solution is reprecipitated in 8 L of purified water (stirred), and is filtered under reduced pressure after being stirred for 20 minutes, while removing precipitates in the reaction solution through a decantation method. White precipitates are obtained in this manner.

These white precipitates are dispersed in 8 L of purified water, and are filtered under reduced pressure after being stirred for 15 minutes. This washing step is repeated three times. In the filtrate of the final washing step, the pH is 6 and the electric conductivity is 26 μS/cm.

Drying is performed through freeze-drying to obtain 93 g of white powder (diacetate cellulose powder) (yield of 88%).

As a result of a $^1$H-NMR measurement (DMSO-$d_6$, 40° C.), the average degree of substitution of the diacetate cellulose powder is 2.34 and the weight average molecular weight Mw is 40,000.

Measurement of Insoluble Portion with Respect to Tetrahydrofuran (THF)

10.0 g of THF is added to 1.000 g of the diacetate cellulose powder. The solution is tightly closed and is stirred for 24 hours at 25° C., and is then allowed to stand for 24 hours. After separating a supernatant solution from the solution, 10.0 g of THF is added to the remaining precipitate portion. The solution of the precipitate portion is tightly closed and is stirred for 24 hours at 25° C., and is then allowed to stand for 24 hours. A precipitate portion that has not been dissolved in THF is taken by filtering and is washed with 10.0 g of THF. Then, the precipitate portion is vacuum-dried.

The yield, that is, the amount of a THF insoluble portion is 20 mg, and the weight ratio is 2% by weight.

In addition, as a result of a $^1$H-NMR measurement (DMSO-$d_6$, 40° C.), the average degree of substitution of the THF insoluble portion is 2.51.

Measurement of Insoluble Portion with Respect to Dimethyl Sulfoxide (DMSO)

10.0 g of DMSO is added to 1.000 g of the diacetate cellulose powder. The solution is tightly closed and is stirred for 24 hours at 25° C., and is then allowed to stand for 24 hours. After separating a supernatant solution from the solution, 10.0 g of DMSO is added to the remaining precipitate portion. The solution of the precipitate portion is tightly closed and is stirred for 24 hours at 25° C., and is then allowed to stand for 24 hours. A precipitate portion that has not been dissolved in DMSO is taken by filtering and is washed with 10.0 g of methylene chloride. Then, the precipitate portion is vacuum-dried.

The yield, that is, the amount of a DMSO insoluble portion is 7 mg, and the weight ratio is 0.7% by weight.

In addition, as a result of a $^1$H-NMR measurement (DMSO-$d_6$, 40° C.), the average degree of substitution of the DMSO insoluble portion is 1.20.

Ca Stabilizer 70 g of the diacetate cellulose powder is dispersed in 700 g of purified water, 0.2 g of calcium acetate monohydrate is added thereto, and the mixture is stirred for 18 hours at room temperature (24° C.) to obtain white precipitates. The white precipitates are filtered under reduced pressure and are dried through freeze-drying to obtain white powder.

Examples 2 to 5

Diacetate cellulose is prepared in the same manner as in Example 1 except that the reaction conditions of the "depolymerization", the "acetylation" and the "deacetylation" are changed as shown in Table 1, and evaluation is performed. The results are shown in Table 1.

Comparative Examples 1 to 5

Diacetate cellulose is prepared in the same manner as in Example 1 except that the reaction conditions of the "depolymerization", the "acetylation" and the "deacetylation" are changed as shown in Table 1, and evaluation is performed. The results are shown in Table 1.

TABLE 1

| | [Depolymerization] Reflux time in 1M hydrochloric acid | [Acetylation] | [Deacetylation] 2.54 parts by weight of hydrochloric acid | Average degree of substitution (NMR) | Weight average molecular weight | Insoluble portion in THF Content rate | Average degree of substitution | Insoluble portion in DMSO | Performance of molded product Bending elastic modulus (MPa) | Tensile strength (Mpa) |
|---|---|---|---|---|---|---|---|---|---|---|
| Example 1 | 2 h | Sulfuric acid 7.8% by weight, RT/4 h | 40° C./15 h | 2.34 | 40,000 | 2% | 2.51 | 0.7% | 4400 | 58 |
| Example 2 | 1 h | Sulfuric acid 7.8% by weight, RT/4 h | 40° C./15 h | 2.36 | 47,000 | 2% | 2.53 | 0.6% | 4800 | 68 |
| Example 3 | 0.5 h | Sulfuric acid 7.8% by weight, RT/4 h | 40° C./16.5 h | 2.23 | 56,000 | 1.5% | 2.51 | 0.8% | 5600 | 75 |
| Example 4 | 2 h | Sulfuric acid 7.8% by weight, RT/4 h | 40° C./12.5 h | 2.45 | 42,000 | 3% | 2.58 | 0.5% | 4300 | 60 |
| Example 5 | 1 h | Sulfuric acid 17.3% by weight, RT/3 h | 23° C./48 h | 2.38 | 47,000 | 1.0% | 2.55 | 0.6% | 4800 | 67 |
| Comparative Example 1 | 2 h | Sulfuric acid 1.7% by weight, RT/5 h | 41° C./14 h | 2.47 | 36,000 | 28% | 2.77 | 2.5% | 900 | 14 |
| Comparative Example 2 | 1 h | Sulfuric acid 1.7% by weight, RT/5 h | 41° C./14 h | 2.46 | 46,000 | 29% | 2.75 | 2.6% | 1100 | 16 |
| Comparative Example 3 | 0.5 h | Sulfuric acid 1.7% by weight, RT/5 h | 41° C./14 h | 2.48 | 56,000 | 30% | 2.78 | 2.7% | 1200 | 18 |
| Comparative Example 4 | 0.5 h | Sulfuric acid 5.0% by weight, RT/5 h | 40° C./15 h | 2.38 | 55,000 | 12% | 2.74 | 1.6% | 1600 | 24 |
| Comparative Example 5 | 0.5 h | Sulfuric acid 5.6%) by weight, RT/5 h | 40° C./15 h | 2.36 | 55,000 | 8% | 2.70 | 1.3% | 1800 | 26 |

Kneading

The diacetate cellulose powder after being subjected to the Ca-stabilizing processing is kneaded by a biaxial kneading device (manufactured by Toshiba Machine Co., Ltd., TEX41SS) at 230° C. to obtain resin composition pellets.

Injection Molding

Regarding the obtained pellets, an ISO multipurpose dumbbell test piece (100 mm of the length of a test portion, 10 mm of the width thereof, and 4 mm of the thickness thereof) is manufactured using an injection molding machine (manufactured by Nissei Plastic Industrial Co., Ltd., PNX40) at cylinder temperature of 230° C. and mold temperature of 40° C.

Evaluation Test

Bending Elastic Modulus

The bending elastic modulus of the obtained ISO multipurpose dumbbell test piece is measured through a method according to ISO-178 using a universal tester (manufactured by Shimadzu Corporation, AUTOGRAPH AG-Xplus). In addition, the tensile strength is measured using the same device.

It may be seen that Examples 1 to 5 which contains a cellulose derivative, in which the weight average molecular weight is 10,000 to 75,000, the average degree of substitution of an acyl group is 1.8 to 2.5, and in which the amount of an insoluble portion (THF insoluble portion) of this cellulose derivative when being dissolved in tetrahydrofuran (THF) at 25° C. satisfies the range are excellent in the bending elastic modulus and the tensile strength compared to Comparative Examples 1 to 5 in which the amount of a THF insoluble portion of a cellulose derivative is out of the range.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a cellulose derivative in which at least one hydroxyl group is substituted with an acyl group, the cellulose derivative having a weight average molecular weight of 20,000 to 75,000 and an average degree of substitution of the acyl group of 1.8 to 2.5, and which exhibits an amount (weight ratio) of an insoluble portion, when being dissolved in tetrahydrofuran (THF) at 25° C., of less than or equal to 5% by weight, and
   an adipic acid ester-containing compound.

2. The resin composition according to claim 1,
   wherein the amount (weight ratio) of the insoluble portion of the cellulose derivative when being dissolved in dimethyl sulfoxide (DMSO) at 25° C. is less than or equal to 1% by weight.

3. The resin composition according to claim 1,
   wherein a ratio of the cellulose derivative occupied in the total amount of the resin composition is greater than or equal to 70% by weight.

4. The resin composition according to claim 2,
   wherein a ratio of the cellulose derivative occupied in the total amount of the resin composition is greater than or equal to 70% by weight.

5. A resin composition comprising:
   a cellulose derivative in which at least one hydroxyl group is substituted with an acyl group, the cellulose derivative having a weight average molecular weight of 10,000 to 75,000 and an average degree of substitution of the acyl group of 1.8 to 2.5, and which exhibits an amount (weight ratio) of an insoluble portion, when being dissolved in tetrahydrofuran (THF) at 25° C., of less than or equal to 5% by weight, and
   an adipic acid ester-containing compound.

6. The resin composition according to claim 1,
   wherein the acyl group is an acetyl group.

7. The resin composition according to claim 2,
   wherein the acyl group is an acetyl group.

8. The resin composition according to claim 3,
   wherein the acyl group is an acetyl group.

9. The resin composition according to claim 5,
   wherein the acyl group is an acetyl group.

10. A resin molded article comprising a resin composition comprising a cellulose derivative in which at least one hydroxyl group is substituted with an acyl group, the cellulose derivative having a weight average molecular weight of 10,000 to 75,000 and an average degree of substitution of the acyl group of 1.8 to 2.5, and which exhibits an amount (weight ratio) of an insoluble portion, when being dissolved in tetrahydrofuran (THF) at 25° C., of less than or equal to 5% by weight, and an adipic acid ester-containing compound.

11. A resin molded article comprising the resin composition according to claim 2.

12. A resin molded article comprising the resin composition according to claim 3.

13. A resin molded article comprising the resin composition according to claim 6.

14. The resin molded article according to claim 10, which is an injection molded article.

* * * * *